(12) United States Patent
Dewey et al.

(10) Patent No.: US 10,922,187 B2
(45) Date of Patent: Feb. 16, 2021

(54) DATA REDIRECTOR FOR SCALE OUT

(71) Applicant: Quantum Corporation, San Jose, CA (US)

(72) Inventors: Matthew C. Dewey, Broomfield, CO (US); Stephen Peter Jakas, Manningham (AU)

(73) Assignee: Quantum Corporation, San Jose, CA (US)

( * ) Notice: Subject to any disclaimer, the term of this patent is extended or adjusted under 35 U.S.C. 154(b) by 261 days.

(21) Appl. No.: 16/203,897

(22) Filed: Nov. 29, 2018

(65) Prior Publication Data

US 2019/0171530 A1 Jun. 6, 2019

Related U.S. Application Data

(60) Provisional application No. 62/592,039, filed on Nov. 29, 2017.

(51) Int. Cl.
*G06F 11/00* (2006.01)
*G06F 11/14* (2006.01)
*G06F 16/182* (2019.01)
*G06F 16/215* (2019.01)

(52) U.S. Cl.
CPC ........ *G06F 11/1453* (2013.01); *G06F 16/183* (2019.01); *G06F 16/215* (2019.01); *G06F 2201/80* (2013.01); *G06F 2201/82* (2013.01)

(58) Field of Classification Search
CPC ...... G06F 16/215; G06F 16/183; G06F 16/27; G06F 16/1748; G06F 16/24556; G06F 11/1469; G06F 11/1453; G06F 16/122; G06F 11/1461; G06F 3/0641; G06F 11/1458; G06F 11/1466; G06F 11/1658; G06F 11/1662; G06F 11/2064; G06F 11/2082

See application file for complete search history.

(56) References Cited

U.S. PATENT DOCUMENTS 9,342,525 B1 * 5/2016 Wideman ............ G06F 16/1752
2013/0138613 A1 * 5/2013 Paulzagade ......... G06F 11/1451
707/647

* cited by examiner

*Primary Examiner* — Augustine K. Obisesan
(74) *Attorney, Agent, or Firm* — Eschweiler & Potashnik, LLC

(57) ABSTRACT

Embodiments redirect data from a source to a plurality of deduplication blockpools. In one embodiment, operations include accessing a binary large object (BLOB) that includes a plurality of blocklets, a blocklet having a hash value; upon determining that the plurality of blocklets includes less than a threshold number of blocklets: selecting, according to a first rule set, a target blockpool from among the plurality of deduplication blockpools; upon determining that the plurality of blocklets includes at least the threshold number of blocklets: selecting, according to a second, different rule set, a target blockpool. The second rule set includes a Balance-Query rule that computes a fitness value for a member of the plurality of deduplication blockpools, and selects a target blockpool based, at least in part, on the fitness value. Embodiments provide the BLOB to the target blockpool.

23 Claims, 10 Drawing Sheets

DATA REDIRECTOR FOR SCALE OUT

REFERENCE TO RELATED APPLICATION

This Application claims priority to U.S. Provisional Application No. 62/592,039 filed on Nov. 29, 2017, the contents of which are hereby incorporated by reference in their entirety.

BACKGROUND

A data storage system may provide data from a source (e.g. a client) to a deduplication pool for deduplication. A deduplication pool may be, for instance, a blockpool. Data may be distributed from multiple sources to multiple deduplication pools. In existing data storage approaches that employ distributed blockpools, the scale out across nodes is hidden inside of the blockpool. Thus, clients are largely, or completely, unaware that the pool is implemented across multiple nodes. Existing approaches to distributing data across multiple nodes suffer from several drawbacks.

In existing data storage systems that include a one-to-one correspondence of source to blockpool, existing approaches to distributing data across multiple nodes require a redesign of the system architecture, and subsequent reimplementation of the current blockpool. Such re-architecture or reimplementation involves high implementation costs. Existing approaches also incur high locking latency costs. The granularity of existing approaches requires locking of structures across nodes. The latency of cluster-level lock can therefore dominate any gains acquired from parallelism.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Example apparatus, operations, methods, circuits, and other embodiments facilitate distributing electronic data from a source to multiple deduplication pools. Example embodiments employ a data redirector to facilitate the use of larger, faster deduplication pools compared to existing approaches. Example embodiments facilitate the implementation of larger, faster deduplication pools using existing deduplication blockpools with minimal modification or disruption of the existing blockpools. Embodiments described herein minimize changes required to an existing blockpool when implementing multiple blockpools. Embodiments described herein support an overall larger deduplication pool than existing single-node approaches.

In one embodiment, a maximum capacity for a deduplication pool is P times larger for a system with P pools, where P is an integer, compared to a single pool approach. Embodiments described herein provide aggregate performance larger than a single pool approach. Embodiments provide the specific technical improvement of aggregate system performance scaling linearly with the number of pools P, where hardware for each pool is independent, compared to existing approaches. Aggregate performance also assumes increased numbers of active streams. Embodiments described herein further support local data ingest (e.g. virtual tape library (VTL)/network attached storage (NAS), object stores) or remote data ingest (e.g. Accent enabled applications). Embodiments described herein also minimize redundant data elimination (RDE) loss. Example embodiments may employ a binary large object (BLOB) redirection approach, or a blocklet-level redirection approach.

Figure 1:
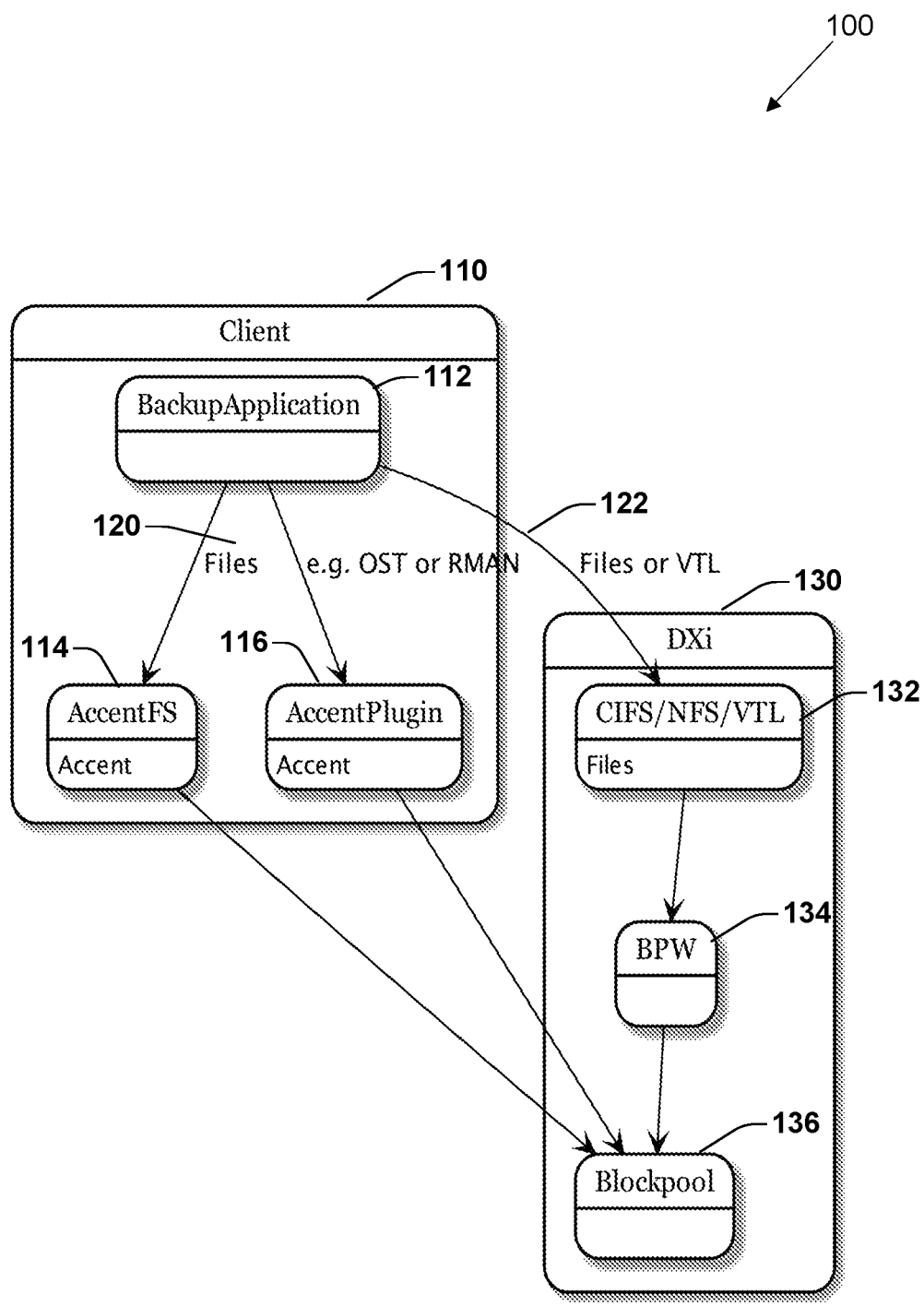
FIG. 1 illustrates a data storage system that employs a deduplication blockpool.

FIG. 1 illustrates a data storage system 100 according to existing techniques that employs a deduplication blockpool 136. Existing data storage system 100 may include a client 110. Client 110 includes a backup application 112. Backup application 112 backs up data, including files 120 or files/VTL 122. Files 120 are backed up through AccentFS 114, or AccentPlugin 116. AccentFS 114 or AccentPlugin 116 directs data to be backed up (e.g. files 120 or files/VTL 122) to blockpool 136, which is implemented as part of deduplication server 130. Deduplication server 130 includes common internet file system (CIFS)/network file system (NFS)/VTL 132 and blockpool wrapper (BPW) 134. Backup application 112 may backup files/VTL 122 to deduplication server 130. Blockpool 136 may be, for example, a hard disk drive (HDD), a shingled magnetic recording (SMR) device, a cloud storage system, or other storage device. To add additional blockpools to data storage system 100, or to achieve a distributed blockpool system, according to existing techniques, the existing blockpool 136 may require substantial re-architecture and reimplementation costs in both time and resources. Furthermore, existing approaches operate at a level of granularity such that data structures must be locked across nodes. This cluster-level locking may dominate any performance gains that might have been achieved by parallelism.

Figure 2:
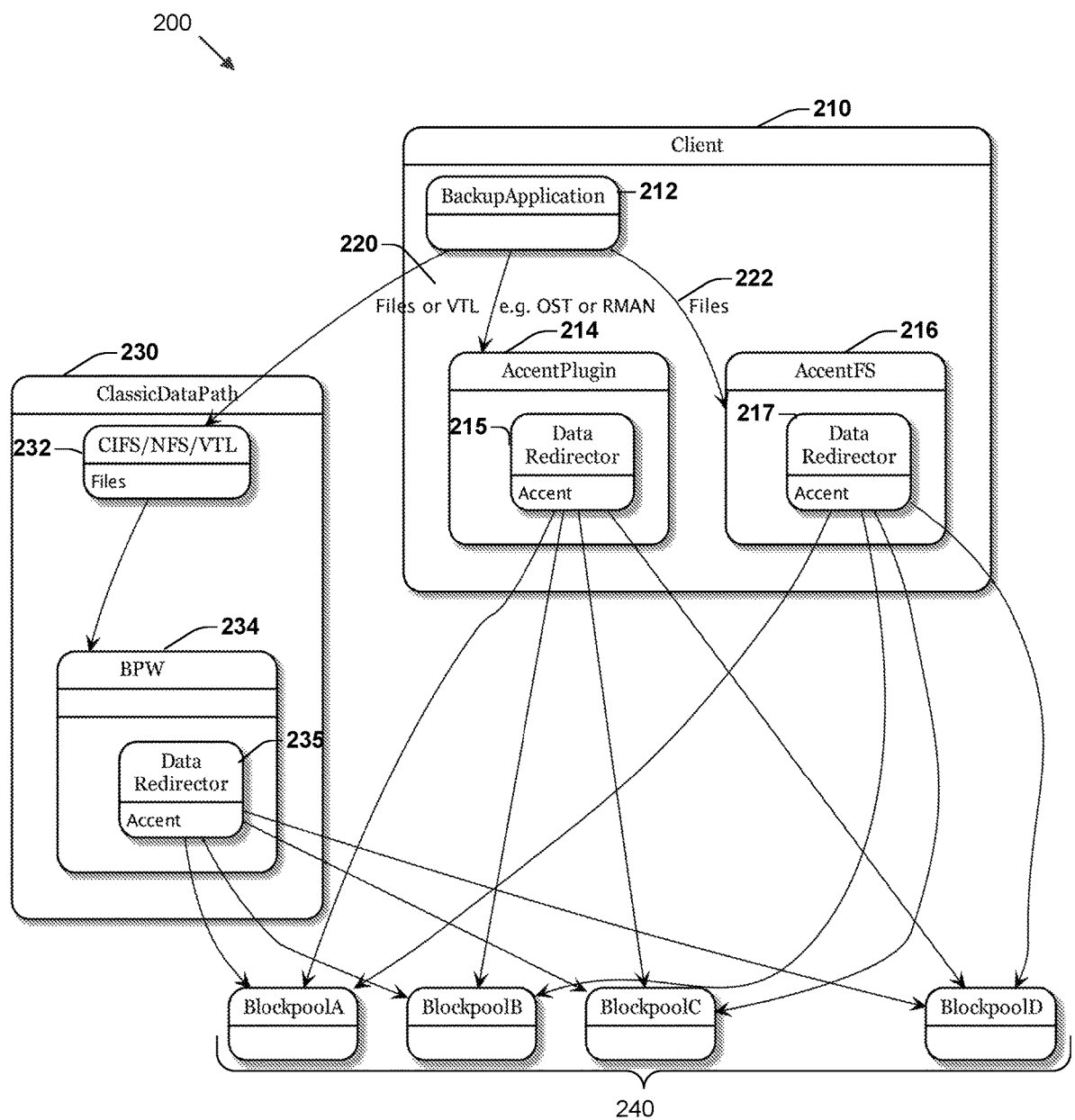
FIG. 2 illustrates an exemplary data storage system that employs binary large object (BLOB) level redirection with three data redirectors and four deduplication blockpools.

FIG. 2 illustrates an embodiment of a data storage system 200 that employs BLOB-level data redirection. System 200 includes multiple deduplication blockpools 240. Deduplication blockpools 240 includes at least one deduplication blockpool (e.g. Blockpool A, Blockpool B, Blockpool C, and Blockpool D). In the illustrated embodiment, four deduplication blockpools are illustrated, but embodiments described herein may employ other, different numbers of deduplication blockpools. A deduplication blockpool may be, for example, an HDD, an SMR device, a cloud storage system, or other data storage device. Data storage system 200 includes client 210. Client 210 may include a backup application 212. Backup application 212 backs up flies/VTL 220 or files 222. Backup application 212 may direct files/VTL 220 to a classic data path 230. Classic data path 230 includes CIFS/NFS/VTL 232 and a blockpool wrapper (BPW) 234. The BPW 234 mediates between presentation layer IO streams and a block pool (e.g., Blockpool A, Blockpool B, Blockpool C, or Blockpool D). BPW 234 includes data redirector 235. Data redirector 235 directs files/VTL to deduplication blockpools 240.

Backup application 212 may direct files 222 or files/VTL 220 to Accent plugin 214 or AccentFS 216. Accent plugin 214 includes Data Redirector 215. AccentFS 216 includes Data Redirector 217. Data Redirector 215 or Data Redirector 217 redirects files 222 to deduplication blockpools 240.

The embodiment illustrated in FIG. 2 may employ multiple different attach methods to the cluster of block pools 240. In one embodiment, one or more different attach methods may be employed.

While the embodiment illustrated in FIG. 2 illustrates three redirectors (215, 217, and 235) and four block pools 240, embodiments described herein are not limited to three redirectors and four blockpools. Embodiments described herein may employ at least one data redirector and at least one block pool. The number of data redirectors or the number of blockpools may be scaled independently of each other. Scaling the number of data redirectors or the number of blockpools independently facilitates achieving a desired performance, capacity, or interface.

Embodiments described herein simultaneously support multiple data redirectors on a cluster. Embodiments described herein facilitate maintaining linear performance scaling with additional data redirectors by minimizing communication between data redirectors. For example, data redirector 215 may not need to know what data redirector 217 or data redirector 235 is doing, because data redirector 215 and data redirector 217 or data redirector 235 may query deduplication blockpools 240 for information required to select a target blockpool independently of each other. Data redirectors, including data redirectors 215, 217, or data redirector 235 may employ operations, methods, circuits, or other embodiments described herein.

Example embodiments may include a data redirector that uses BLOB redirection. A BLOB redirection data redirector selects, using a first rule set or a second rule set, a target blockpool from among deduplication blockpools 240, and sends a whole BLOB to the selected target member (e.g., Blockpool A, Blockpool B, Blockpool C, or Blockpool D) of the underlying blockpools (e.g. block pools 240). A blockpool is a BLOB storing engine. The decision for redirecting a BLOB to an underlying block pool is made for an individual BLOB separately from other BLOBs, but the unit of decision is the entire BLOB. In one embodiment, a BLOB has a size of 256 MB. In another embodiment, other BLOB sizes may be employed, for example 16 MB. Data (e.g. a BLOB) is directed to one of the block pools in BLOB-sized and aligned chunks. The behavior of a cluster (e.g., blockpools 240) is, in one embodiment, linear with that a of a single block pool.

Embodiments described herein minimize RDE loss. In some situations, multiple copies of blocklets may be created in the underlying block pools. Embodiments described herein mitigate this RDE loss by computing a fitness value for members of blockpools 240, and selecting a target blockpool based, at least in part, on the fitness value.

In embodiments described herein, for a BLOB, redirection only consumes resources in the selected target pool. Embodiments described herein may balance the load across block pools, facilitating the number of simultaneous streams handled by the system to be P times that of a single pool. In this example, P is the number of block pools, and P is an integer.

Depending on how BLOBs are redirected, some block pools may receive more unique data than other, different block pools. If a pool becomes full significantly before the other pools in the system, the scaling benefits of the cluster may be reduced. Merely balancing by directing equal numbers of BLOBs across block pools is not sufficient to balance the capacity due to differences in deduplication or compression of different BLOBs. Example embodiments therefore maintain balanced capacity across pools by computing a fitness value for a candidate target blockpool, and selecting a target blockpool for a BLOB based, at least in part, on the fitness value.

Embodiments described herein facilitate garbage collection (GC) scaling. There are two major phases to GC: collecting references to BLOBs, and detection or removal of unreferenced BLOBs from the pool. The collection of references scales with system size, and is not, in some embodiments, significantly affected by BLOB redirection. However, detection and removal of unreferenced BLOBs may occur in a pool independently of other pools. Since the load each pool sees is in an example embodiment is largely the same as the load it would see in a single-pool, non-data-redirector instance, GC performance in example embodiments scales linearly with the number of pools.

Embodiments described herein thus improve on existing approaches to distributing data to multiple block pools at least by facilitating increased stream counts. Embodiments described herein further improve on existing approaches that employ a single block pool by facilitating linear scaling with respect to aggregate performance, GC performance, or replication.

One example embodiment of a data redirector that employs BLOB redirection is now described. A BLOB-level data redirector includes a structured set of rules to select a target blockpool. The structured set of rules may include a first line (i.e., a first rule set) of rules, and a second, different line of rules (i.e., a second, different rule set). While in this example, two lines of rules are described, other numbers or configurations of rules may be employed. A rule in this embodiment may return one of three values: ANSWER, SOFT_NONE, or HARD_NONE. ANSWER results in a selected pool, e.g., a target blockpool, being given. SOFT_NONE results in control being passed to the next rule on the same line. HARD_NONE results in control being passed to the first rule in the next line. One example structured set of rules may be defined as:

```
BALANCE_AFFINITY_RULES=(
    (_MinLookAhead, _Affinity, _Random),
    (_BalanceQuery, _Affinity, _Size, _Random)
)
```

In this example, the first line of rules handles sets of blocklets that are too short (i.e., the set of blocklets contains less than a threshold number of blocklets) for the rules deployed in the second line of rules. The first line of rules includes the rules _MinLookAhead, _Affinity, and _Random. If _MinLookAhead returns SOFT_NONE, there are too few blocklets in the BLOB being analyzed to consider using _BalanceQuery. In this case, example embodiments will attempt to use _Affinity, or alternately, use _Random to pick a target pool randomly. The value of _Affinity is set to the last selected pool. A particular value for _Affinity (e.g. a particular pool) may be used a specified number of times before being cleared. The number of times a particular pool identified by _Affinity is used may be represented by a counter. In embodiments described herein, the specified number of times may be described as a threshold number of times. The threshold number of times may be determined as a function of the rule used to select the current target pool.

In this example, the second line of rules performs work not done by the first line of rules. The second line of rules includes the rules _BalanceQuery, _Affinity, _Size, and _Random. The rule _BalanceQuery computes a fitness value for a blockpool. _BalanceQuery selects a subset of the blocklets in a BLOB, queries the deduplication pools for a count of which blocklets are contained in a pool, and also acquires current information about the number of blocklets stored in the pool. Information about the number of blocklets stored in the pool may include the remaining capacity of the pool. The number of matching blocklets and the size (i.e., remaining capacity) of the pool are used to calculate the fitness of a pool. The pool with the greatest fitness is selected, and set as the current affinity, which resets the _Affinity usage counter. If there is a tie, or if all the pools have no matches, _BalanceQuery returns a SOFT_NONE, and the _Affinity rule is tested. If there is a valid current affinity, that value is returned. Otherwise, _Affinity returns a SOFT_NONE and the _Size rule is used.

The _Size rule determines the remaining capacities of members of the plurality of blockpools, respectively, and selects the pool having the largest remaining capacity. If the _Size rule fails to pick a pool, (e.g. because multiple pools have the same remaining capacity), the _Random rule selects a target blockpool from among the pools that have the same, largest remaining capacity. In other embodiments, the _Size rule may select the pool having the least amount of capacity used.

In one embodiment, _BalanceQuery computes the fitness value as a function of a query part and a balance part. In one embodiment, _BalanceQuery computes the fitness value as:

querypart=NumberMatches/NumberBlockletsTested balancepart=1−PoolSize/LargestPoolSize Fitness=querypart+balancepart Fitness, in this embodiment, ranges from 0 to 2. Higher values for fitness indicate a stronger match for the pool. Thus, a pool having a higher value will be selected as a target blockpool over a different pool having a different, lower fitness value. This calculation of Fitness gives equal weight to matches and pool size imbalance. When the pools are balanced, the balance part is close to 0, giving most weight to the query results. Thus, embodiments provide improved performance compared to existing approaches that may select a target pool solely based on remaining capacity, or solely based on the number of matching blocks.

In one embodiment, the querypart and the balancepart of the Fitness value computed by _BalanceQuery may be normalized or weighted. For example, the number of matches may be normalized, ensuring values within the range of 0 to 1. Similarly, the pool size value may be normalized, ensuring values in the range of 0 to 1. Thus, in this embodiment, the Fitness may be computed as:

Fitness=normalized querypart+normalized balancepart.

In this embodiment, the weights given to normalized matches vs normalized pool size may be adjusted. For example, embodiments may apply a multiplier to normalized matches to allow the system to create pool size imbalance in favor of more data matching, thereby increasing deduplication, and further minimizing RDE loss. Embodiments may choose this approach when the system is getting nearly full to fit the most data. In another situation, embodiments may tell the system to favor balancing at the expense of decreased deduplication. Embodiments may choose this to help spread the load across the pools more evenly which may result in improved performance.

In one embodiment, rules included in the first line of rules (i.e., first rule set) or the second line of rules (i.e., second rule set) may be defined as follows:

```
def _MinLookAhead(self, cxt):
    """
    @return: HARD_NONE if sufficient pending blocklets for lookahead
    SOFT_NONE if insufficient pending blocklets for lookahead
    """
def _Affinity(self, cxt):
    """
    @return: the pool affinity if we have one as the Answer and
    decrement the affinity usage counter.
    Otherwise return SOFT_NONE
    """
def _Random(self, cxt):
    """
    @return: Always returns ANSWER
    If cxt has 'fittest' - randomly select from among those answers
    Otherwise, randomly choose from among one of the blocklet stores.
    """
def _Size(self, cxt):
    """
    @return: Returns ANSWER and the smallest pool in the ctx['fittest']
    unless there are multiple pools with the same smallest size (a tie).
    In which case it updates ctx['fittest'] with the tieing pools and returns
    SOFT_NONE
    """
def _BalanceQuery(self, cxt):
    """
    Queries fitness of match against all pools (this includes matching
    blocklets and
    pool sizes).
    @return: ANSWER and best matching pool (based on Query
    results)
    SOFT_NONE if no pools have matches or if we have a fitness
    match tie (this lets Afffinity or Size resolve the tie)
    In all cases, populate cxt['fittest'] with the best information.
    """
```

In another embodiment, rules included in the first line of rules or the second line of rules may be defined using other, different definitions. Other numbers of rules, or numbers of lines of rules, may be employed.

Parameters used by example methods, apparatus, systems, rules, operations, and other embodiments may be defined as follows:

The parameter MinLookAhead may be used by the rule _MinLookAhead. The parameter MinLookAhead specifies the minimum number of blocklets needed to use Query rules. In one embodiment, the parameter MinLookAhead is hard coded to ten. In another embodiment, other values may be used.

The parameter AffinityLength defines what value the affinity counter is set to. When a decision is reached via _Size or _Random, the affinity counter is set to this value. In one embodiment the default value is twelve. In another embodiment, other values may be used.

The parameter QueryAffinity defines what value the affinity counter is set to in situations where AffinityLength is not applied. In one embodiment, when a decision is reached via _QueryBalance, the affinity counter is set to the QueryAffinity value. In one embodiment, the default QueryAffinity value is six. In another embodiment, other values may be used.

The parameter LookAhead determines how many blocklets within a BLOB to consider for a query. Using a very large value forces the entire BLOB to be used. In one embodiment, the default value is 20000. In another embodiment, other values may be used. For example, less than the entire BLOB may be considered. In one embodiment, only the first half of the BLOB is considered, which cuts data buffering requirements in half but still provides sufficient data for effective redirection. In one embodiment, where the LookAhead value forces the entire BLOB to be used, the entire BLOB is buffered on the redirector node before being sent to a target blockpool.

The parameter decimate is used by the rule _BalanceQuery to select a subset of the blocklets in the BLOB. A blocklet is selected for the subset if the blocklet hash modulo decimate is 0. In one embodiment, values as high as 1000 may be used, reducing the overhead of a query by only using $1/1000$ of the blocklets to redirect BLOBs. For example, a decimate value of 500 to 1000 reduces the number of blocklets queried to approximately 16 to 32 blocklets for a 256 MB BLOB. In another embodiment, other values may be used for decimate.

An example embodiment of a data redirector that employs blocklet-level redirection is now described. As data is ingested, the data is filtered, parsed, or hashed. In one embodiment, the hash is examined and used to shard the data to different deduplication pools. For example, one sharding approach may use a hash modulo P, where P is the number of participating pools. Data for a pool is written into a BLOB in the selected pool. Reconstruction information to allow reassembly of data from multiple pools identifies the BLOB and offset within the BLOB for a blocklet of original data. The size of reconstruction information is approximately 4 bytes per blocklet, which results in minimal RDE losses of less than 1%. The reconstruction data may be stored in a BPW tag list, or other location or data structure including, for example, a meta-BLOB facility, or a file system metadata store (e.g., file system metadata store 346).

In one embodiment that employs blocklet-level redirection, garbage collection, which includes collecting referenced BLOBs and detecting unreferenced BLOBs, scales linearly with the number of BLOBs. Detection of unreferenced BLOBs may be performed in parallel in different pools independently.

Blocklet redirection results in very low RDE loss compared to existing approaches. Since the blocklet is used to deduplicate data, steering data to deduplication pools using the blocklet hash ensures data duplicates will be found. Blocklet redirection also facilitates improved uniform workload balancing compared to existing approaches. Since blocklet hashes behave as if uniformly random, the workload on different pools will be equal. Blocklet redirection further facilitates uniform capacity balancing. Again, due to blocklet hashes being uniformly random, different pools will have comparable capacities. In one embodiment, blocklet redirection results in all pools in a system participating in each ingest stream. This provides increased performance in at least single stream or small stream count ingest, compared to existing approaches.

Figure 3:
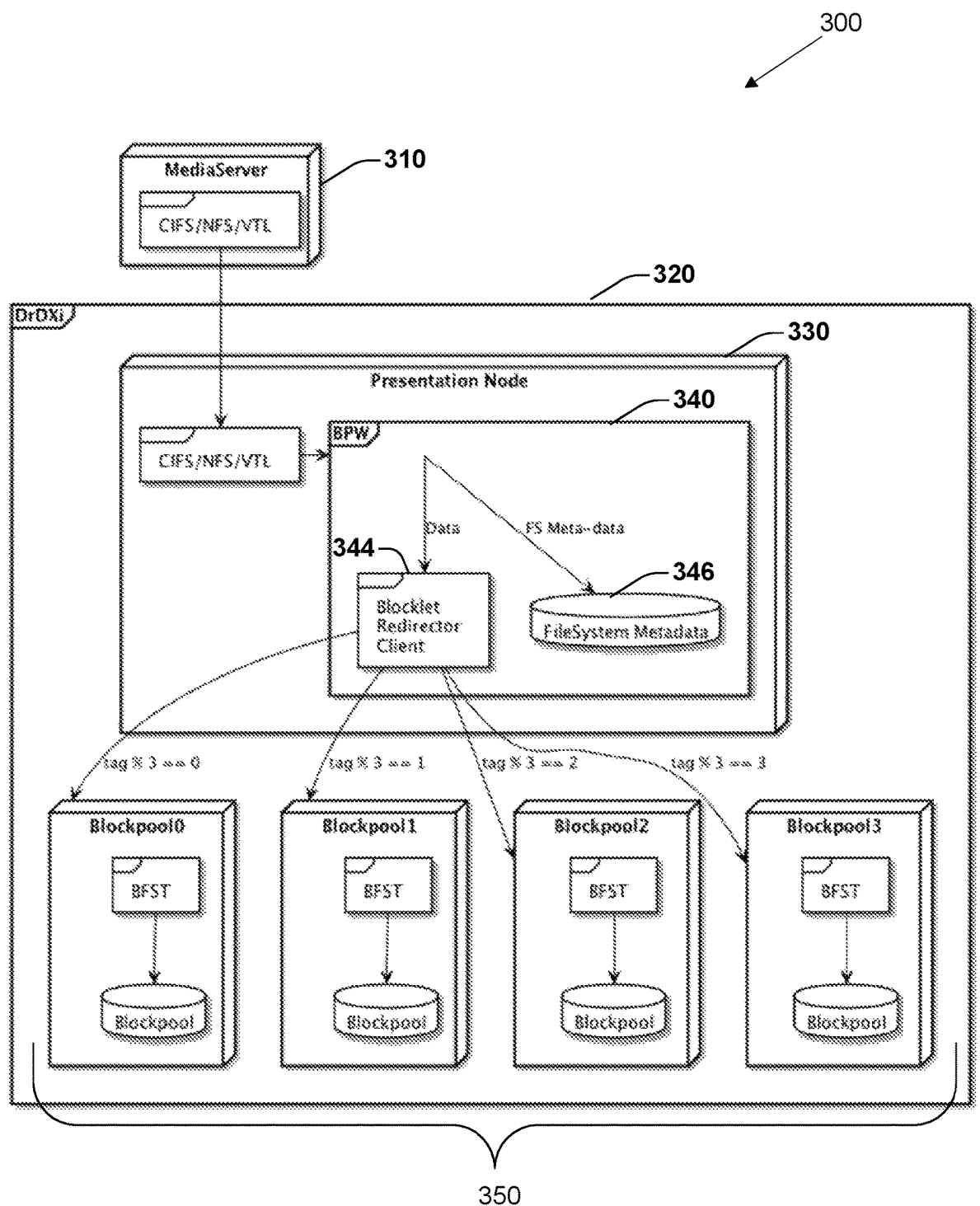
FIG. 3 illustrates an exemplary data storage system that employs blocklet-level redirection.

FIG. 3 illustrates an example data storage system 300 that employs blocklet-level redirection. A media server 310 directs data to a deduplication system 320. Deduplication system 320 includes a presentation node 330. Deduplication system 320 also includes a plurality of blockpools 350. In this example, while four blockpools are illustrated, other numbers of blockpools may be employed. Presentation node 330 includes a BPW 340, blocklet redirector client 344, and filesystem metadata store 346. Blocklet redirector client 344 is configured to analyze ingested data provided by, for example, media server 310. Blocklet redirector client 344 selects target blockpools based, in one embodiment, on a hash of blocklets to be stored in the plurality of blockpools 350. Blocklet redirector client 344 selects target blockpools according to blocklet-level redirection operations, methods, apparatus, circuits, and other embodiments described herein. While one blocklet redirector client 344 is illustrated, other, greater numbers of blocklet redirector clients may be implemented.

One example embodiment includes a method for distributing data from a source to multiple deduplication pools according to BLOB-level redirection or blocklet-level redirection. One such example embodiment includes accessing a data BLOB having a first size. The first size may be for example, 256 MB. The BLOB includes at least one blocklet. The at least one blocklet has a second size. The second size is smaller than the first size. This embodiment includes determining if a plurality of deduplication blockpools supports blocklet-level redirection or BLOB-level redirection.

In this embodiment, using blocklet-level redirection, a blocklet hash is examined and directed to one of the plurality of blockpools. The direction is determined using a calculation based on the blocklet hash. One approach is to calculate the blocklet hash modulo the number of pools to pick the appropriate pool. Other approaches can be used as long as the calculation is deterministic. Reconstruction information to assemble the blocklets in the original order is recorded in the filesystem metadata.

In this embodiment, using BLOB-level redirection includes determining if the BLOB has at least a threshold number of blocklets. Upon determining that the BLOB has less than a threshold number of blocklets, this embodiment includes selecting, according to a first rule set, a target blockpool.

Upon determining that the BLOB has at least a threshold number of blocklets, this example includes selecting, according to a second rule set, a target blockpool. The second rule set selects the target blockpool based, at least in part, on a fitness value computed as a function of the number of blocklets stored in the blockpool that match a subset of the blocklets in the BLOB, and of the ratio of the remaining capacity of the blockpool with the remaining capacity of the blockpool having the largest remaining capacity.

This example further includes providing the BLOB to the target blockpool. In one embodiment, selecting, according to the first rule set, the target blockpool, includes selecting the target blockpool according to an Affinity rule, or selecting the target blockpool randomly from the plurality of deduplication blockpools. In one embodiment, selecting, according to the second rule set, the target blockpool, includes selecting the target blockpool according to a BalanceQuery rule, an Affinity rule, a Size rule, or selecting the target blockpool randomly from the plurality of deduplication blockpools.

Like numbers refer to like or similar elements throughout the description of the figures. When an element is referred to as being "connected" to another element, it can be directly connected to the other element or intervening elements may be present. In contrast, when an element is referred to as being "directly connected" to another element, there are no intervening elements present. Other words used to describe the relationship between elements should be interpreted in a like fashion (e.g., "between" versus "directly between," "adjacent" versus "directly adjacent," etc.)

Some portions of the detailed descriptions herein are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated. The physical manipulations create a concrete, tangible, useful, real-world result.

It has proven convenient at times, principally for reasons of common usage, to refer to these signals as bits, values, elements, symbols, characters, terms, or numbers. It should be borne in mind, however, that these and similar terms are to be associated with the appropriate physical quantities and are merely convenient labels applied to these quantities. Unless specifically stated otherwise, it is to be appreciated that throughout the description, terms including processing, computing, and determining refer to actions and processes of a computer system, logic, processor, or similar electronic device that manipulates and transforms data represented as physical (electronic) quantities.

Example methods may be better appreciated with reference to flow diagrams. For purposes of simplicity of explanation, the illustrated methodologies are shown and described as a series of blocks. However, it is to be appreciated that the methodologies are not limited by the order of the blocks, as some blocks can occur in different orders or concurrently with other blocks from that shown and described. Moreover, less than all the illustrated blocks may be required to implement an example methodology. Blocks may be combined or separated into multiple components. Furthermore, additional or alternative methodologies can employ additional, not illustrated blocks.

Figure 4:
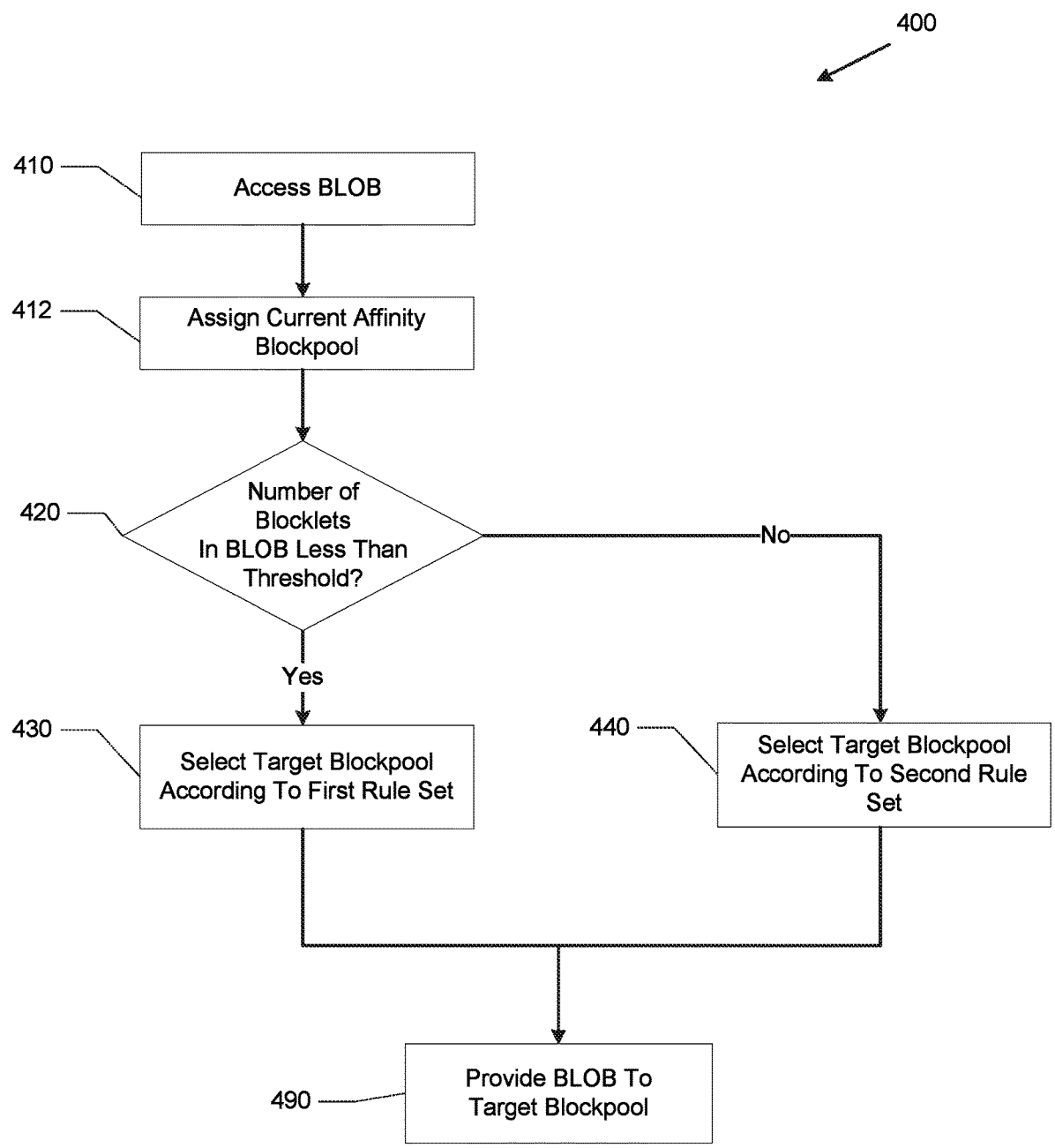
FIG. 4 illustrates exemplary operations for BLOB-level data redirection.

FIG. 4 illustrates an example set of operations 400 that may be performed by a processor for redirecting data from a source to a member of a plurality of deduplication blockpools. A processor(s) may include any combination of general-purpose processors and dedicated processors (e.g., graphics processors, application processors, etc.). The processors may be coupled with or may include memory or storage and may be configured to execute instructions stored in the memory or storage to enable various apparatus, applications, or operating systems to perform the operations. The memory or storage devices may include main memory, disk storage, or any suitable combination thereof. The memory or storage devices may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, or solid-state storage.

The set of operations 400 includes, at 410, accessing a BLOB having a first size. The BLOB includes a plurality of blocklets, a blocklet having a hash value and a second size. The second size is smaller than the first size. Accessing the BLOB may include retrieving electronic data from a computer memory, receiving a computer file over a computer network, or other computer or electronic based action. In one embodiment the BLOB has a first size of 256 MB. In another embodiment, the BLOB has a first size of 16 MB. In another embodiment, the BLOB may have a different first size. In one embodiment, blocklets are generated using a variable length parsing technique. In this embodiment, blocklet size may range from 8 KB to 32 KB in size, with a mean blocklet size of 16 KB. In another embodiment, other blocklet sizes, or mean blocklet sizes, may be employed. In another embodiment, fixed-blocklet length deduplication may be employed.

The set of operations may also include, at 412, assigning a member of the plurality of deduplication blockpools as the current affinity blockpool. Assigning a member of the plurality of deduplication blockpools as the current affinity blockpool includes determining which member of the plurality of deduplication blockpools was the most recently selected target blockpool from among the plurality of deduplication blockpools. In this embodiment, assigning a member of the plurality of deduplication blockpools as the current affinity blockpool further includes assigning the most recently selected target blockpool as a current affinity blockpool. In another embodiment, the current affinity blockpool may be assigned using other techniques.

The set of operations 400 also includes, at 420, determining if the plurality of blocklets includes less than a threshold number of blocklets. Upon determining that the plurality of blocklets includes less than a threshold number of blocklets, the set of operations 400 also includes, at 430, selecting, according to a first rule set, a target blockpool from among the plurality of deduplication blockpools. In one embodiment, the threshold number of blocklets is ten. In another embodiment, the threshold number of blocklets may be another, different number. The threshold number of blocklets may be user-defined, or may be adjusted to achieve particular performance characteristics.

Figure 5:
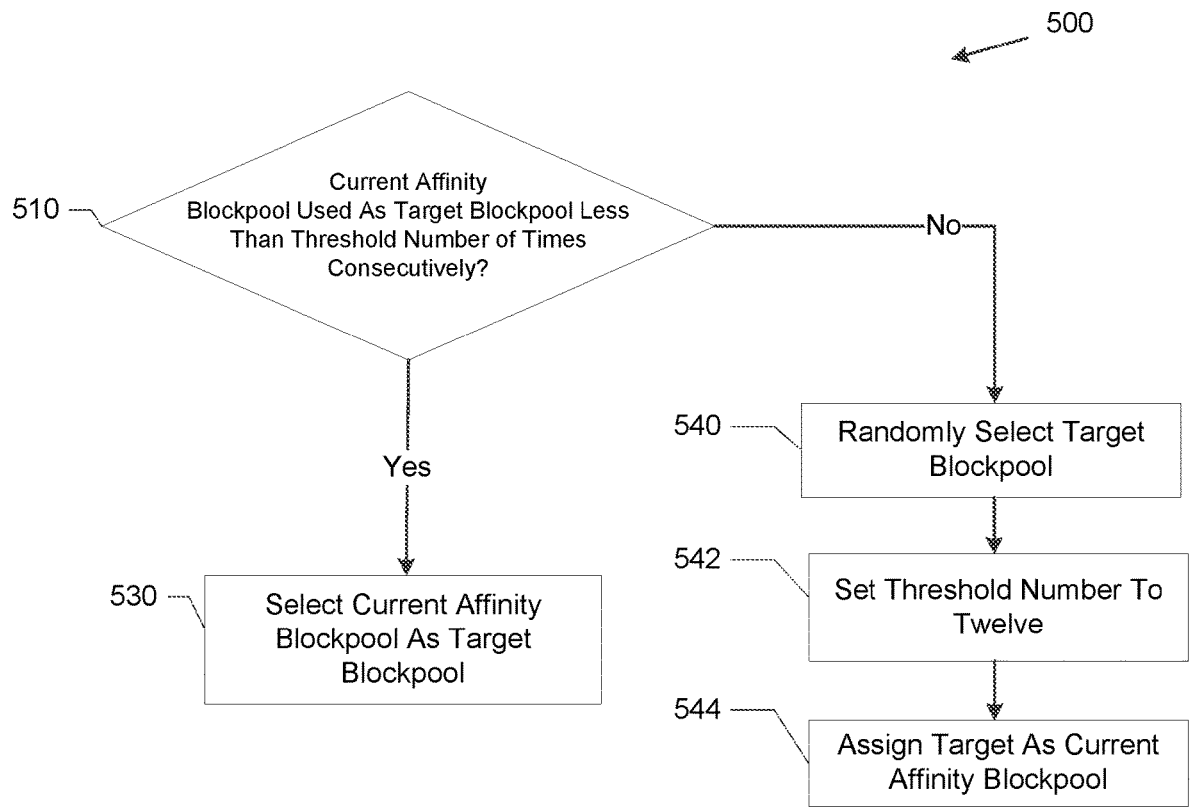
FIG. 5 illustrates exemplary operations for BLOB-level data redirection according to a first rule set.

FIG. 5 illustrates a set of operations 500 for selecting, according to a first rule set, a target blockpool from among the plurality of deduplication blockpools. Operations 500 may be employed by embodiments described herein, including operations 400, or apparatus 800. Operations 500 include, at 510, determining if the current affinity blockpool has been used as the target blockpool less than a threshold number of times consecutively. In one embodiment, determining if the current affinity blockpool has been used as the target blockpool less than a threshold number of times consecutively may including applying an _Affinity rule.

Operations 500 also include, upon determining that the current affinity blockpool has been used as the target blockpool less than the threshold number of times consecutively, at 530, selecting the current affinity blockpool as the target blockpool. In one embodiment, selecting the current affinity blockpool as the target blockpool includes returning the target blockpool as the value of _Affinity ANSWER.

Operations 500 also include, upon determining that the current affinity blockpool has been used at least the threshold number of times consecutively, at 540, selecting randomly from among the plurality of deduplication blockpools, another, different member of the plurality of deduplication blockpools as the target blockpool. Selecting a target blockpool randomly may include, in one embodiment, applying a _Random rule, and returning the selected target blockpool as the value of _Random ANSWER.

Operations 500 also include, at 542, setting the threshold number of times to twelve. In another embodiment, the threshold number of times may be set to another, different value. For example, setting the threshold number of times to a higher value may reduce the frequency at which the current affinity blockpool changes.

Operations 500 further include, at 544, assigning the target blockpool as the current affinity blockpool.

Returning to operations 400, upon determining that the plurality of blocklets includes at least the threshold number of blocklets, the set of operations 400 also includes, at 440 selecting, according to a second, different rule set, a target blockpool from among the plurality of deduplication blockpools. The second, different rule set includes at least one rule, which may be a _BalanceQuery rule, that computes a fitness value for a member of the plurality of deduplication blockpools, and that selects a target blockpool from among the plurality of deduplication blockpools based, at least in part, on the fitness value.

In one embodiment, the fitness value is computed, based, at least in part, on a correspondence between a subset of the plurality of blocklets and blocklets stored in a member of the plurality of deduplication blockpools. The subset of the plurality of blocklets contains fewer members than the plurality of blocklets. The fitness value is further based on a ratio of the remaining storage capacity of the member of the plurality of deduplication blockpools to the remaining storage capacity of the member of the plurality of deduplication blockpools having the largest remaining storage capacity. In one embodiment, the fitness value is computed according to a _BalanceQuery rule as described herein. In one embodiment, the fitness value has a value of [0, 2]. In another embodiment, the fitness value may be computed using other, different approaches, or may have a value within another, different range.

Figure 6:
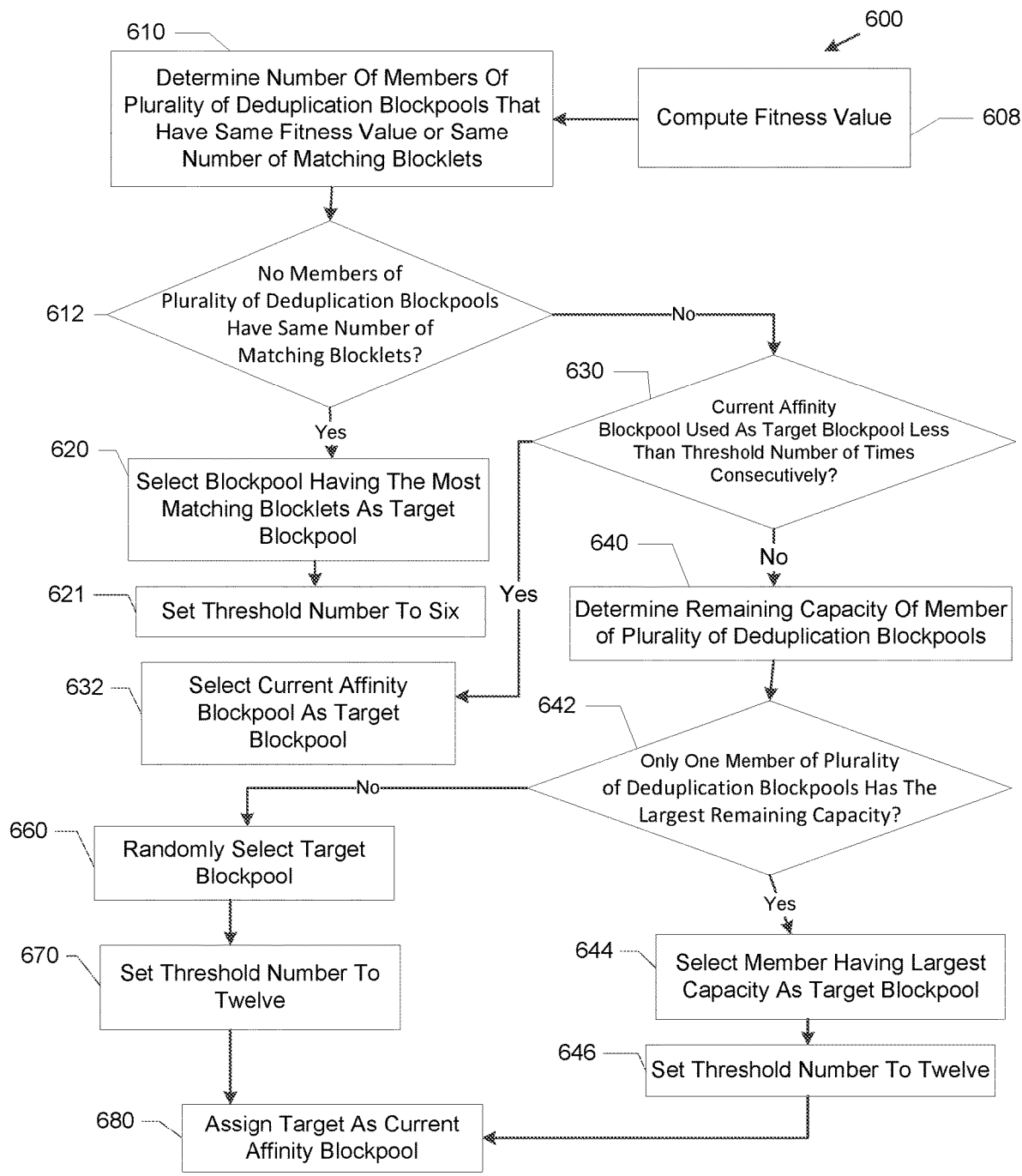
FIG. 6 illustrates exemplary operations for selecting a target blockpool for BLOB-level data redirection according to a second rule set.

FIG. 6 illustrates a set of operations 600 for selecting, according to a second rule set, a target blockpool from among the plurality of deduplication blockpools. Operations 600 may be employed by embodiments described herein, including operations 400, or apparatus 800. Operations 600 include, at 608, computing a fitness value for a member of the plurality of deduplication blockpools. In one embodiment, the fitness value may be calculated for a deduplication blockpool as: the number matching blocklets divided by the number of blocklets queried, plus one minus the pool size (e.g., remaining capacity) divided by the size (e.g., remaining capacity) of the largest pool.

The fitness value may be may be normalized or weighted as described herein. For example, in one embodiment, upon determining that the remaining capacity of the plurality of deduplication blockpools is less than a threshold value, embodiments may weight the fitness value to favor increased deduplication. In this embodiment, upon determining that the remaining capacity of the plurality of deduplication blockpools is not less than the threshold value, embodiments may weight the fitness value to favor load balancing across the plurality of deduplication blockpools. In this embodiment, the threshold value may be, for example, 25%, 10%, or other value of remaining capacity.

Operations 600 also include, at 610, determining the number of members of the plurality of deduplication blockpools have that the same fitness value as each other, or have the same number of matching blocklets with the subset of the plurality of blocklets.

Operations 600 also include, upon determining at 612 that no members of the plurality of deduplication blockpools have a matching fitness value or have the same numbers of matching blocklets with the subset of the plurality of blocklets, selecting, at 620, the member of the plurality of deduplication blockpools having the best fitness value or most matching blocklets as the target blockpool. The operations 600 also include, at 621, setting the threshold number of times to six. While the threshold number of times is set to six in this embodiment, other, different values may be employed.

Operations 600 also include, upon determining at 612 that at least two members of the plurality of deduplication blockpools have the same fitness value, or have the same number of matching blocklets with the subset of the plurality of blocklets, or upon determining that no members of the plurality of deduplication blockpools have any blocklets matching the subset of the plurality of blocklets, determining, at 630, if the current affinity blockpool has been used as the target blockpool less than a threshold number of times consecutively.

Operations 600 also include, upon determining that the current affinity blockpool has been used as the target blockpool less than the threshold number of times consecutively, selecting, at 632, the current affinity blockpool as the target blockpool.

Operations 600 also include, upon determining that the current affinity blockpool has been used at least the threshold number of times consecutively, determining, at 640, the remaining capacity of the pools which had the same best fitness values, for example, those pools that had tied fitness values from the application of the _BalanceQuery rule.

Operations 600 also include, upon determining at 642 that only one member of the plurality of deduplication blockpools has the largest remaining capacity, selecting, at 644, the member of the plurality of blockpools having the largest remaining capacity as the target blockpool. Operations 600 also include, at 646, setting the threshold number of times to twelve. In another embodiment, the threshold number of times may be set to another, different value.

Operations 600 also include, upon determining at 642 that at least one other, different member of the plurality of deduplication blockpools has the same largest remaining capacity, selecting, at 660, randomly from the deduplication blockpools which have the same largest remaining capacity, a target blockpool. In embodiments described herein, determining the remaining capacity of a member of the plurality of deduplication blockpools, and determining the number of matching blocklets a deduplication blockpool has in common with the subset of the plurality of blocklets does not require a deduplication blockpool to store any results about the number of matching blocklets or remaining capacity, and thus embodiments do not require any writes on the members of the plurality of deduplication blockpools when performing these operations (i.e., applying a _BalanceQuery rule).

Operations 600 also include, at 670, setting the threshold number of times to twelve. In another embodiment, the threshold number of times may be set to another, different value.

Operations 600 further include, at 680, assigning the target blockpool as the current affinity blockpool. In one embodiment, if the target blockpool assigned as the current affinity blockpool at 680 is a different target blockpool than the current affinity blockpool assigned at 412, then the value of the counter that indicates the number of times a particular pool identified by _Affinity has been used consecutively, is reset.

Figure 7:
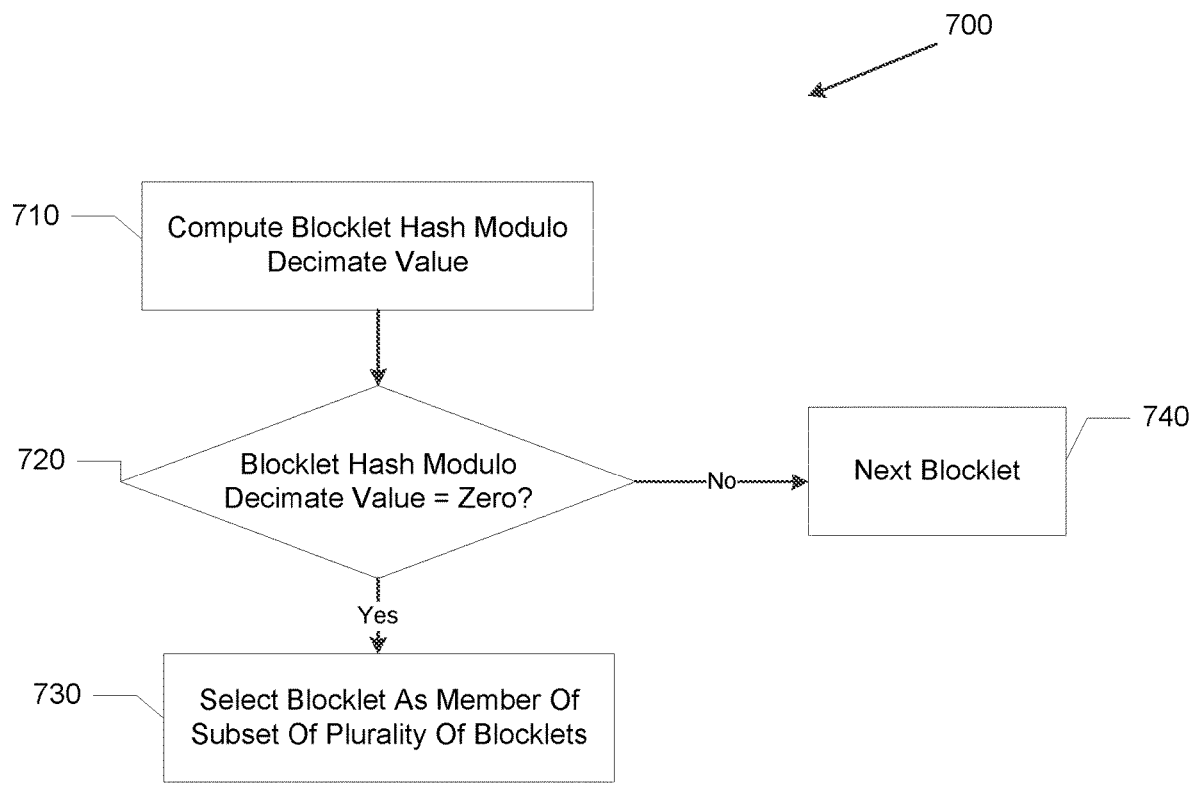
FIG. 7 illustrates exemplary operations for generating a subset of a plurality of blocklets for BLOB-level data redirection.

FIG. 7 illustrates a set of operations 700 for selecting the subset of the plurality of blocklets. Operations 700 include, at 710, computing a value of a blocklet hash modulo a decimate value. The decimate value is an integer. In one embodiment, the decimate value is at least five-hundred (500), and less than or equal to one-thousand (1000). In another embodiment, the decimate value may have other, different values. In one embodiment, the blocklet hash is computed at 710. In another embodiment, the blocklet hash may have already been computed, and thus control may proceed to block 720 without needing to compute the blocklet hash at 710.

Operations 700 also include, at 720, determining if the blocklet hash modulo the decimate value equals zero. Operations 700 further include, upon determining that the blocklet hash modulo the decimate value equals zero, selecting, at 730, the blocklet as a member of the subset of the plurality of blocklets. In another embodiment, other techniques may be employed to select a subset of the plurality of blocklets. Thus, according to embodiments, the subset contains fewer than all the blocklets in the plurality of blocklets. For example, a decimate value of between five-hundred and one-thousand results, in one embodiment, approximately sixteen (16) to thirty-two (32) blocklets being selected for the subset from a 256 MB BLOB, the BLOB having, for example, approximately 16,000 blocklets. Upon determining that the blocklet hash modulo the decimate value does not equal zero, the blocklet is not selected, and, at 740, other blocklets may be analyzed, or operations 700 may terminate, or return control to other operations.

Returning to operations 400, the set of operations 400 further includes, at 490, providing the BLOB to the target blockpool. Providing the BLOB to the target blockpool may include retrieving electronic data from a computer memory, receiving a computer file over a computer network, or other computer or electronic based action.

Like numbers refer to like or similar elements throughout the description of the figures. When an element is referred to as being "connected" to another element, it can be directly connected to the other element or intervening elements may be present. In contrast, when an element is referred to as being "directly connected" to another element, there are no intervening elements present. Other words used to describe the relationship between elements should be interpreted in a like fashion (e.g., "between" versus "directly between," "adjacent" versus "directly adjacent," etc.).

Figure 8:
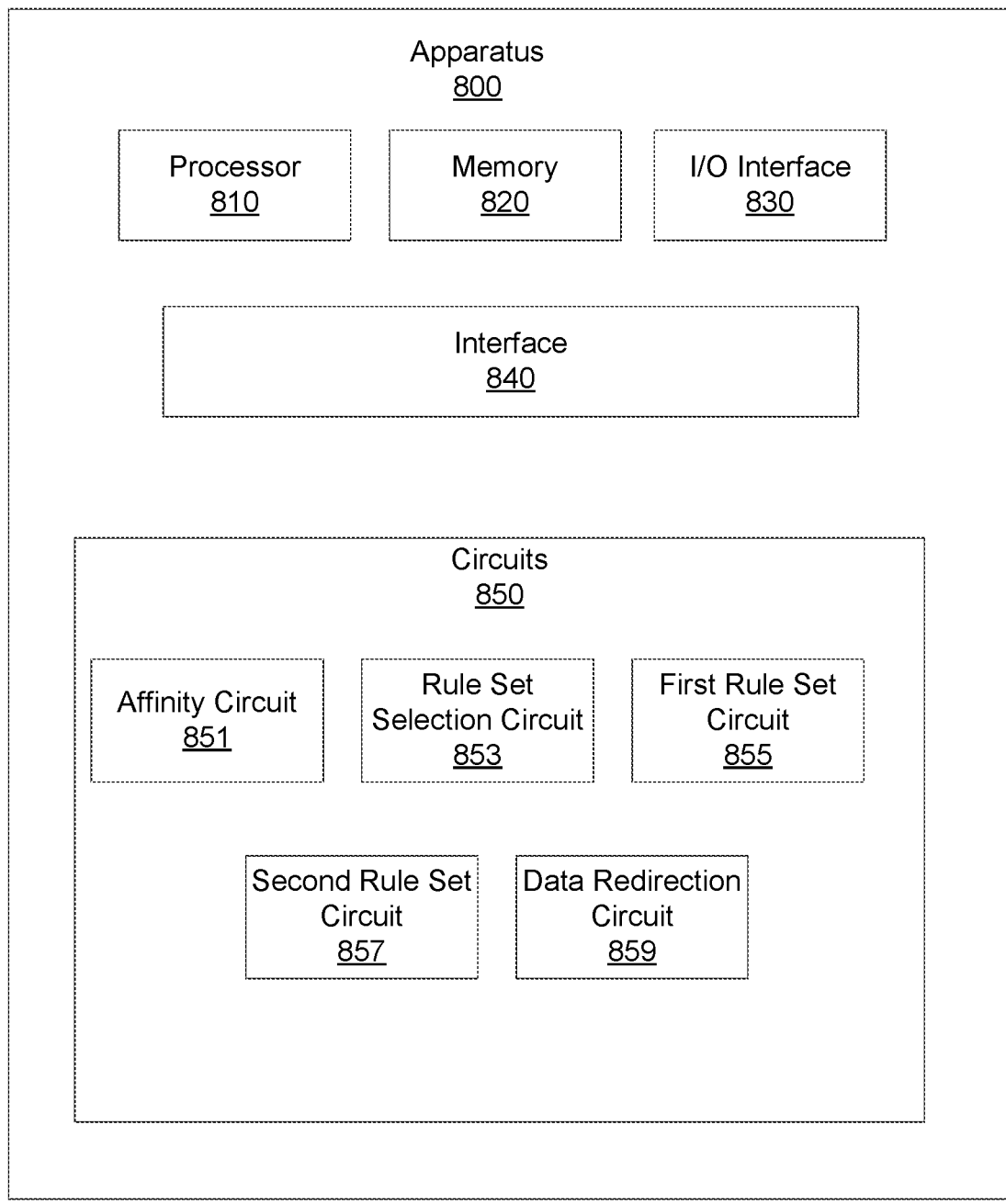
FIG. 8 illustrates an example apparatus associated with BLOB-level data redirection.

FIG. 8 illustrates an example apparatus 800 configured for BLOB-level data redirection. Apparatus 800 includes a processor 810, a memory 820, an input/output (I/O) interface 830, and a set of circuits 850 that is connected to the processor 810, memory 820, and I/O interface 830 by an interface 840. The memory 820 may be configured to store a BLOB, the BLOB having a plurality of blocklets. Memory 820 may be further configured to store metadata associated with a BLOB, a blocklet, or a member of a plurality of deduplication blockpools. In one embodiment, processor 810 and the set of circuits 850 facilitate providing BLOB-level data redirection with linear scalability as more blockpools are added to the plurality of deduplication blockpools.

Processor 810 may include any combination of general-purpose processors and dedicated processors (e.g., graphics processors, application processors, etc.). The processors may be coupled with or may include memory, including memory 820, or storage and may be configured to execute instructions stored in the memory or storage to enable various apparatus, applications, or operating systems to perform the operations. The memory or storage devices may include main memory, disk storage, or any suitable combination thereof. The memory or storage devices may include, but are not limited to any type of volatile or non-volatile memory such as DRAM, SRAM, EPROM, EEPROM, Flash memory, or solid-state storage.

Memory 820 is configured to store a BLOB having a first size. The BLOB includes a plurality of blocklets. A member of the plurality of blocklets has a second size. The second size is smaller than the first size. Memory 820 is further configured to store metadata about the BLOB, or metadata or other information about a member of the plurality of deduplication blockpools. For example, a member of the plurality of blocklets may have a hash value. Memory 820 may be configured to store the hash value.

The set of circuits 850 includes affinity circuit 851, rule set selection circuit 853, first rule set circuit 855, second rule set circuit 857, and data redirection circuit 859.

Affinity circuit 851 is configured to determine which member of the plurality of deduplication blockpools was the most recently selected target blockpool from among the plurality of deduplication blockpools. Affinity circuit 851 is further configured to assign the most recently selected target blockpool as the current affinity blockpool. In one embodiment, affinity circuit 851 may determine which member of the plurality of deduplication blockpools was the most recently selected target blockpool by examining a value stored in memory 820, by receiving a signal from a member of circuits 850, or by querying or receiving a signal from the plurality of deduplication blockpools.

Rule set selection circuit 853 is configured to determine the number of blocklets in the plurality of blocklets. Rule set selection circuit 853 is also configured to select the first rule set circuit 855 or the second rule set circuit 857 to select a target blockpool. Rule set selection circuit 853 selects the first rule set circuit 855 or the second rule set circuit 857 based on the number of blocklets in the plurality of blocklets.

In one embodiment, rule set selection circuit 853 is further configured to, upon determining that the number of blocklets in the plurality of blocklets is less than a threshold number of blocklets, select the first rule set circuit 855. In this embodiment, rule set selection circuit 853 is also configured to, upon determining that the number of blocklets in the plurality of blocklets is at least the threshold number of blocklets, select the second rule set circuit 857. In one embodiment, the threshold number of blocklets is ten. In another embodiment, the threshold number of blocklets may be another, different number.

First rule set circuit 855 is configured to select a target blockpool from among the plurality of deduplication blockpools according to an affinity rule or a randomness rule. In one embodiment, first rule set circuit 855 is configured to use an affinity rule (e.g., the rule _Affinity) to determine if the current affinity blockpool has been used as the target blockpool less than a threshold number of times consecutively. First rule set circuit 855 is also configured to, upon determining that the current affinity blockpool has been used as the target blockpool less than the threshold number of times consecutively, select the current affinity blockpool as the target blockpool.

First rule set circuit 855 is also configured to, upon determining that the current affinity blockpool has been used at least the threshold number of times consecutively, select randomly from among the plurality of deduplication blockpools, another, different member of the plurality of deduplication blockpools as the target blockpool. First rule set circuit 855 may be configured to use, for example the rule _Random. First rule set circuit 855 is also configured to, upon determining that the current affinity blockpool has been used at least the threshold number of times consecutively, and upon selecting a target blockpool randomly, set the threshold number of times to twelve. In another embodiment, the threshold number of times may be set to another, different value. First rule set circuit 855 is further configured to assign the target blockpool as the current affinity blockpool.

Second rule set circuit 857 is configured to select a target blockpool from among the plurality of deduplication blockpools according to a balancing rule, an affinity rule, a size rule, or a randomness rule. For example, second rule set circuit 857 may be configured to use the rules _Balance-Query, _Affinity, _Size, or _Random. In one embodiment, second rule set circuit 857 is configured to compute a fitness value for a member of the plurality of deduplication blockpools. Second rule set circuit 857 is configured to compute the fitness value based, at least in part, on a correspondence between a subset of the plurality of blocklets and blocklets stored in a member of the plurality of deduplication blockpools. The subset of the plurality of blocklets contains fewer members than the plurality of blocklets. In one embodiment, second rule set 857 is configured to select the subset of the plurality of blocklets according to operations 700. Second rule set circuit 857 is configured to compute the fitness value further based on a ratio of the remaining storage capacity of the member of the plurality of deduplication blockpools to the remaining storage capacity of the member of the plurality of deduplication blockpools having the largest remaining storage capacity. In one embodiment, second rule set circuit 857 is configured to normalize the values used to compute fitness value, or to weight the fitness value as described herein.

In one embodiment, second rule set circuit 857 is configured to determine the number of members of the plurality of deduplication blockpools that have that the same fitness value or have the same number of matching blocklets with the subset of the plurality of blocklets. Second rule set circuit 857 is configured to, upon determining that no members of the plurality of deduplication blockpools have the same numbers of matching blocklets with the subset of the plurality of blocklets, select the member of the plurality of deduplication blockpools having the highest fitness value or the most matching blocklets as the target blockpool.

Second rule set circuit 857 is configured to, upon determining that at least two members of the plurality of deduplication blockpools have the same fitness value or have the same number of matching blocklets with the subset of the plurality of blocklets, or upon determining that no members of the plurality of deduplication blockpools have any blocklets matching the subset of the plurality of blocklets, determine if the current affinity blockpool has been used as the target blockpool less than a threshold number of times consecutively. Second rule set circuit 857 is configured to, upon determining that the current affinity blockpool has been used as the target blockpool less than the threshold number of times consecutively, select the current affinity blockpool as the target blockpool.

Second rule set circuit 857 is configured to, upon determining that the current affinity blockpool has been used at least the threshold number of times consecutively, determine the remaining capacity of a member of the plurality of deduplication blockpools. Upon determining that only one member of the plurality of deduplication blockpools has the largest remaining capacity, second rule set circuit 857 is configured to select the member of the plurality of blockpools having the largest remaining capacity as the target blockpool, and set the threshold number of times to twelve. In another embodiment, the threshold number of times may be set to another, different value.

Second rule set circuit 857 is configured to, upon determining that at least one other, different member of the plurality of deduplication blockpools has the same largest remaining capacity as the size of the smallest member, select randomly from among the plurality of deduplication blockpools having the same largest remaining capacity, a member of the plurality of deduplication blockpools as the target blockpool. Second rule set circuit 857 is configured to set the threshold number of times to twelve. In another embodiment, the threshold number of times may be set to another, different value. Second rule set circuit 857 is also configured to assign the target blockpool as the current affinity blockpool.

In one embodiment, second rule set circuit 857 is further configured to select the subset of the plurality of blocklets by computing a blocklet hash modulo a decimate value. The decimate value is an integer. Second rule set circuit 857 is configured to, upon determining that the blocklet hash modulo the decimate value equals zero, select the blocklet as a member of the subset of the plurality of blocklets. In one embodiment, the decimate value is at least five-hundred (500) and less than or equal to one-thousand (1000). In another embodiment, other decimate values may be employed.

Data redirection circuit 859 is configured to provide the BLOB to the target blockpool. Providing the BLOB to the target blockpool may include retrieving electronic data from a computer memory, receiving a computer file over a computer network, or other computer or electronic based action.

In another embodiment, apparatus 800 further includes a blocklet-level target blockpool selection circuit. The blocklet-level target blockpool selection circuit is configured to select a target blockpool based on a value of a hash of a member the plurality of blocklets modulo P, where P is the number of deduplication blockpools in a plurality of deduplication blockpools. The blocklet-level target blockpool selection circuit may be configured to control data redirection circuit 859 to provide the blocklet to the target blockpool.

Figure 9:
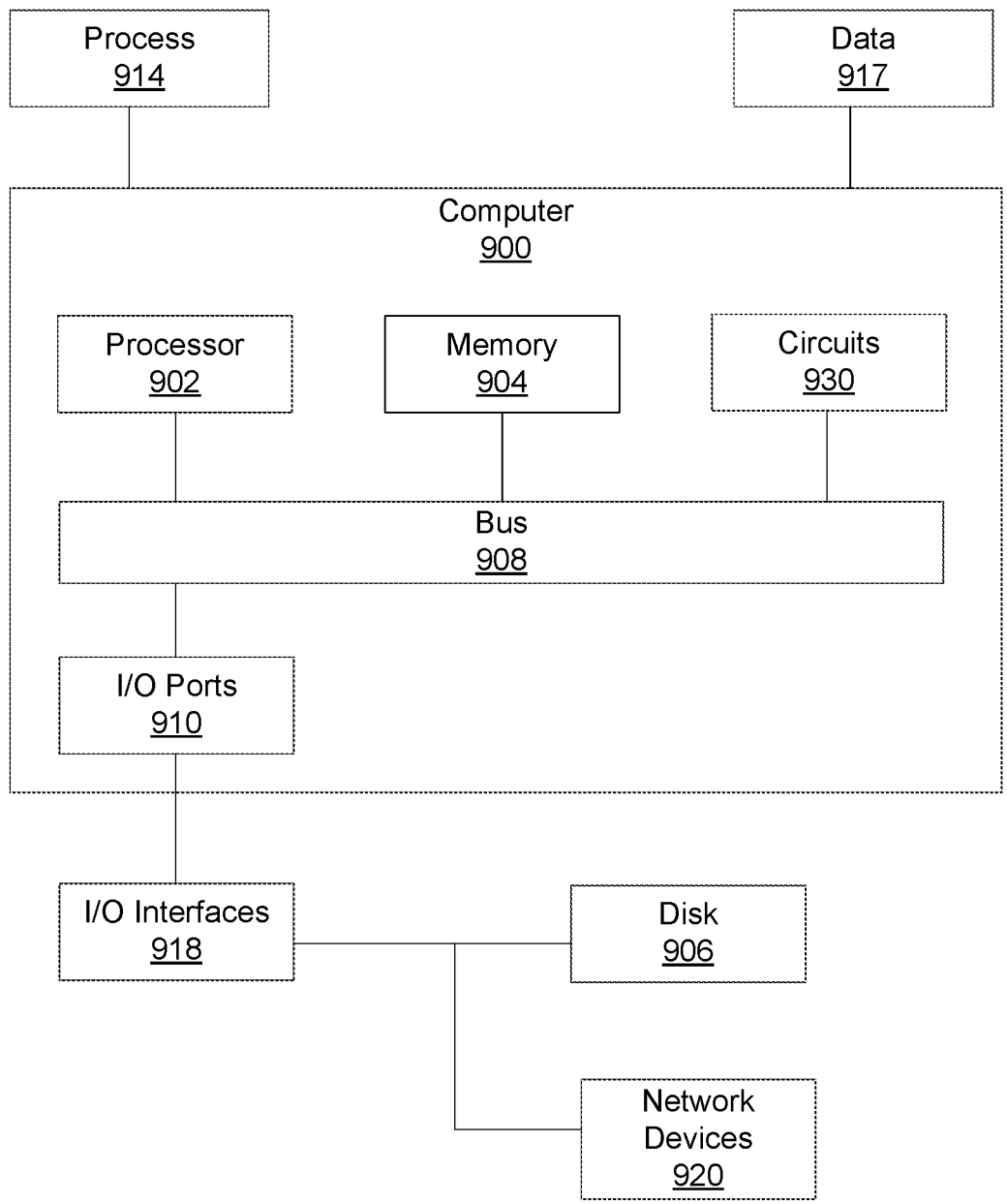
FIG. 9 illustrates an example computer in which example embodiments may be implemented.

FIG. 9 illustrates an example computer 900 in which example methods illustrated herein can operate and in which example methods, apparatus, circuits, operations, or logics may be implemented. In different examples, computer 900 may be part of a data storage system, a data deduplication system, a data redirection system, a storage manager, or may be operably connectable to a data storage system, a data deduplication system, a data redirection system, or a storage manager.

Computer 900 includes a processor 902, a memory 904, and input/output (I/O) ports 910 operably connected by a bus 908. In one example, computer 900 may include a set of logics or circuits 930 that perform operations for or a method of redirecting data from a source to a plurality of deduplication block pools. Thus, the set of circuits 930, whether implemented in computer 900 as hardware, firmware, software, and/or a combination thereof may provide means (e.g., hardware, firmware, circuits) for redirecting data from a source to a plurality of deduplication block pools. In different examples, the set of circuits 930 may be permanently and/or removably attached to computer 900.

Processor 902 can be a variety of various processors including dual microprocessor and other multi-processor architectures. Processor 902 may be configured to perform operations, or steps of methods claimed and described herein. Memory 904 can include volatile memory and/or non-volatile memory. A disk 906 may be operably connected to computer 900 via, for example, an input/output interface (e.g., card, device) 918 and an input/output port 910. Disk 906 may include, but is not limited to, devices like a magnetic disk drive, a tape drive, a Zip drive, a flash memory card, or a memory stick. Furthermore, disk 906 may include optical drives like a CD-ROM or a digital video ROM drive (DVD ROM). Memory 904 can store processes 914 or data 917, for example. Data 917 may, in one embodiment, include, but is not limited to, a BLOB, blocklets, metadata about a BLOB or blocklet, or data associated with a deduplication block pool. Disk 906 or memory 904 can store an operating system that controls and allocates resources of computer 900.

Bus 908 can be a single internal bus interconnect architecture or other bus or mesh architectures. While a single bus is illustrated, it is to be appreciated that computer 900 may communicate with various devices, circuits, logics, and peripherals using other buses that are not illustrated (e.g., PCIE, SATA, Infiniband, 794, USB, Ethernet).

Computer 900 may interact with input/output devices via I/O interfaces 918 and input/output ports 910. Input/output devices can include, but are not limited to, a keyboard, a microphone, a pointing and selection device, cameras, video cards, displays, disk 906, network devices 920, or other devices. Input/output ports 910 can include but are not limited to, serial ports, parallel ports, or USB ports.

Computer 900 may operate in a network environment and thus may be connected to network devices 920 via I/O interfaces 918 or I/O ports 910. Through the network devices 920, computer 900 may interact with a network. Through the network, computer 900 may be logically connected to remote computers. The networks with which computer 900 may interact include, but are not limited to, a local area network (LAN), a wide area network (WAN), or other networks, including the cloud.

Figure 10:
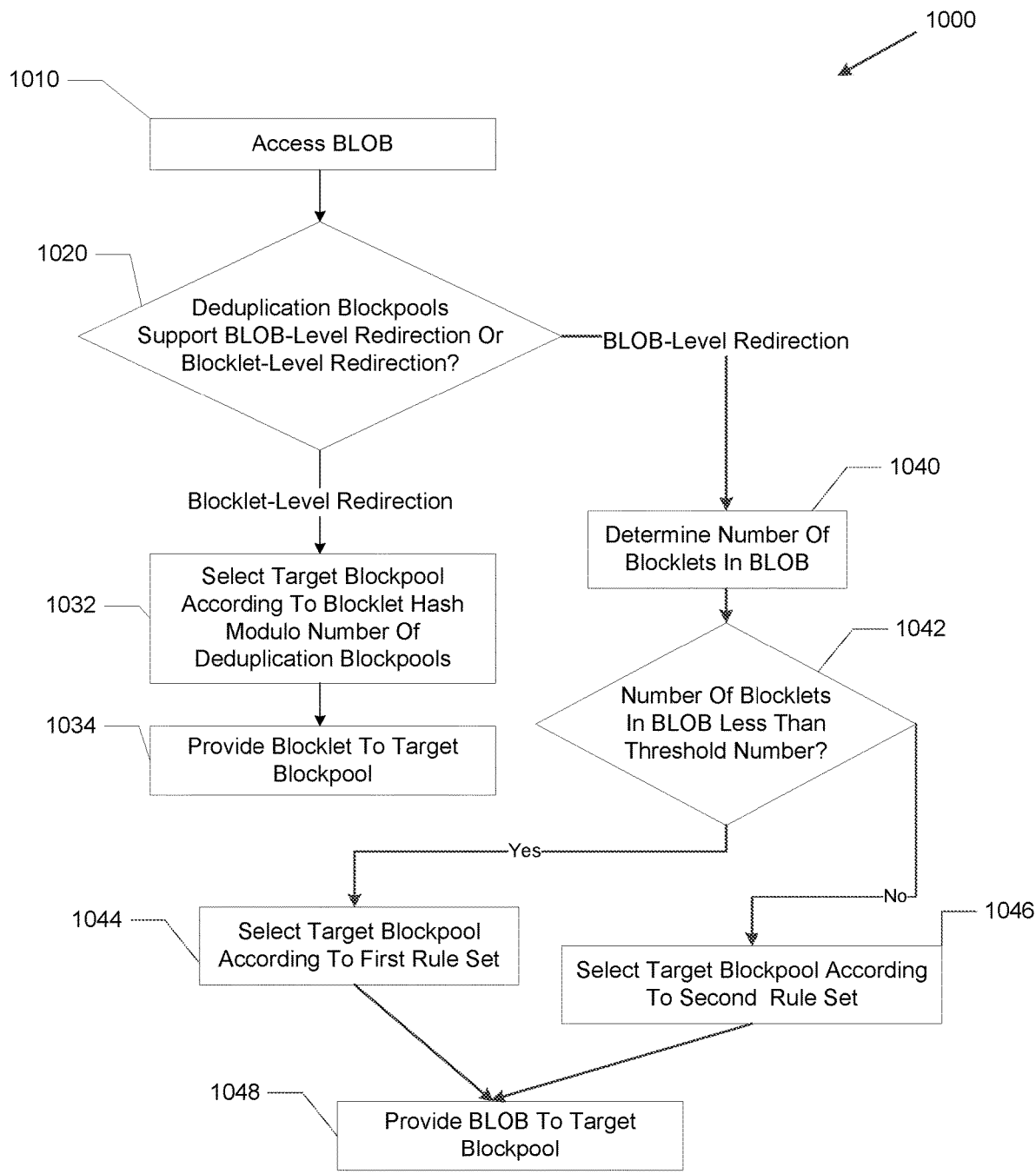
FIG. 10 is a flow diagram of a method for data redirection.

FIG. 10 illustrates an example method 1000 for data redirection to a plurality of deduplication blockpools. Method 1000 includes, at 1010, accessing a BLOB having a first size. The BLOB includes a plurality of blocklets. A blocklet has a second, different size that is smaller than the first size. A blocklet has a hash value.

Method 1000 also includes, at 1020, determining whether the plurality of deduplication blockpools supports BLOB-level redirection, or blocklet-level redirection. Determining whether the plurality of deduplication blockpools supports BLOB-level redirection, or blocklet-level redirection may include retrieving electronic data from a computer memory, receiving a computer file over a computer network, or other computer or electronic based action.

Method 100 also includes, upon determining that the plurality of deduplication blockpools supports blocklet-level redirection, selecting, at 1032, a target blockpool for a member of the plurality of blocklets. In one embodiment, the target blockpool is selected based on a value of the hash of the member of the plurality of blocklets modulo P, where P is the number of deduplication blockpools in the plurality of deduplication blockpools. In another embodiment, other blocklet-level target blockpool selection approaches may be employed to select the target blockpool. Method 1000 also includes, at 1034, providing the blocklet to the target blockpool.

Method 1000 also includes, upon determining that the plurality of deduplication blockpools supports BLOB-level redirection, at 1040, determining the number of blocklets in the BLOB. Determining the number of blocklets in the BLOB may include retrieving electronic data from a computer memory, receiving a computer file over a computer network, or other computer or electronic based action.

Method 1000 also includes, upon determining at 1042 that the number of blocklets in the BLOB is less than a threshold number of blocklets, selecting, at 1044, a target blockpool from among the plurality of deduplication blockpools according to a first rule set. Selecting the target blockpool from among the plurality of deduplication blockpools according to the first rule set may include selecting the target blockpool according to an _Affinity rule, or a Random rule.

Method 1000 also includes, upon determining at 1042 that the number of blocklets in the BLOB is at least the threshold number of blocklets, selecting, at 1046, a target blockpool from among the plurality of deduplication blockpools according to a second, different rule set. The second, different ruleset computes a fitness value for a member of the plurality of deduplication blockpools. The second, different ruleset selects a target blockpool from among the plurality of deduplication blockpools based, at least in part, on the fitness value. The fitness value is computed as a function of a correspondence between a subset of the plurality of blocklets and blocklets stored in a member of the plurality of deduplication blockpools. The subset of the plurality of blocklets contains fewer members than the plurality of blocklets. The fitness value is further computed as a function of a ratio of the remaining storage capacity of the member of the plurality of deduplication blockpools to the remaining storage capacity of the member of the plurality of deduplication blockpools having the largest remaining storage capacity. The fitness value may be normalized, or may be weighted.

Method 1000 also includes, at 1048, providing the BLOB to the target blockpool. Providing the BLOB to the target blockpool may include retrieving electronic data from a computer memory, receiving a computer file over a computer network, or other computer or electronic based action.

Some portions of the detailed descriptions herein are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated. The physical manipulations create a concrete, tangible, useful, real-world result.

It has proven convenient at times, principally for reasons of common usage, to refer to these signals as bits, values, elements, symbols, characters, terms, or numbers. It should be borne in mind, however, that these and similar terms are to be associated with the appropriate physical quantities and are merely convenient labels applied to these quantities. Unless specifically stated otherwise, it is to be appreciated that throughout the description, terms including processing, computing, and determining refer to actions and processes of a computer system, logic, processor, or similar electronic device that manipulates and transforms data represented as physical (electronic) quantities.

Example methods may be better appreciated with reference to flow diagrams. For purposes of simplicity of explanation, the illustrated methodologies are shown and described as a series of blocks. However, it is to be appreciated that the methodologies are not limited by the order of the blocks, as some blocks can occur in different orders or concurrently with other blocks from that shown and described. Moreover, less than all the illustrated blocks may be required to implement an example methodology. Blocks may be combined or separated into multiple components. Furthermore, additional or alternative methodologies can employ additional, not illustrated blocks.

In one embodiment, performing BLOB-level redirection improves the efficiency of the computer running the data storage system since scalability is linear when adding additional blockpools to the plurality of deduplication blockpools. Efficiency is also improved because blockpools do not require expensive re-architecture or reconfiguration when additional blockpools are added to the plurality of deduplication blockpools according to embodiments described herein.

In one example, a method may be implemented as computer executable instructions. Thus, in one example, a computer-readable storage device may store computer executable instructions that if executed by a machine (e.g., processor) cause the machine to perform method 1000, or operations 500, 600, or 700. While executable instructions associated with method 1000, operations 500, 600, or 700 are described as being stored on a computer-readable storage device, it is to be appreciated that executable instructions associated with other example methods or operations described herein may also be stored on a computer-readable medium.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and other similar terms, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer component", as used herein, refers to a computer-related entity (e.g., hardware, firmware, software in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer-readable storage medium" or "computer-readable storage device" as used herein, refers to a non-transitory medium that stores instructions and/or data. "Computer-readable storage medium" or "computer-readable storage device" does not refer to propagated signals, per se. A computer-readable medium may take forms, including, but not limited to, non-volatile media, and volatile media. Non-volatile media may include, for example, optical disks, magnetic disks, and other disks. Volatile media may include, for example, semiconductor memories, dynamic memory, and other memories. Common forms of a computer-readable medium or computer-readable storage device may include, but are not limited to, a floppy disk, a flexible disk, a hard disk, a magnetic tape, a solid state device (SSD) a shingled magnetic recording (SMR) device, other magnetic medium, an ASIC, a CD, other optical medium, a RAM, a ROM, a memory chip or card, a memory stick, and other media from which a computer, a processor or other electronic device can read.

"Data store", as used herein, refers to a physical and/or logical entity that can store data. A data store may be, for example, a database, a table, a file, a data structure (e.g. a list, a queue, a heap, a tree) a memory, a register, or other repository. In different examples, a data store may reside in one logical and/or physical entity and/or may be distributed between two or more logical and/or physical entities.

"Circuit", as used herein, includes but is not limited to hardware, firmware, software in execution on a machine, and/or combinations of each to perform a function(s) or an action(s), and/or to cause a function or action from another logic, method, and/or system. A circuit may include, for example, a software controlled microprocessor, a discrete logic (e.g., ASIC), an analog circuit, a digital circuit, a programmed logic device, or a memory device containing instructions. A circuit may include one or more gates, combinations of gates, or other circuit components. Where multiple circuits are described, it may be possible to incorporate the multiple circuits into one circuit. Similarly, where a single circuit is described, it may be possible to distribute that single circuit between multiple circuits.

An "operable connection", or a connection by which entities are "operably connected", is one in which signals, physical communications, or logical communications may be sent or received. An operable connection may include a physical interface, an electrical interface, or a data interface. An operable connection may include differing combinations of interfaces or connections sufficient to allow operable control. For example, two entities can be operably connected to communicate signals to each other directly or through one or more intermediate entities (e.g., processor, operating system, logic, software). Logical or physical communication channels can be used to create an operable connection.

"Signal", as used herein, includes but is not limited to, electrical signals, optical signals, analog signals, digital signals, data, computer instructions, processor instructions, messages, a bit, or a bit stream, that can be received, transmitted and/or detected.

"Software", as used herein, includes but is not limited to, one or more executable instructions that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, or programs including separate applications or code from dynamically linked libraries.

"User", as used herein, includes but is not limited to one or more persons, software, logics, applications, computers or other devices, or combinations of these.

While example methods, apparatus, and other embodiments have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and other embodiments described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A non-transitory computer-readable storage device storing instructions that when executed by a processor control the processor to perform operations for distributing data from a source to a plurality of deduplication blockpools, the operations comprising:
   accessing a binary large object (BLOB) having a first size, where the BLOB includes a plurality of blocklets, a blocklet having a hash value and a second size, where the second size is smaller than the first size;
   upon determining that the plurality of blocklets includes less than a threshold number of blocklets:
      selecting, according to a first rule set, a target blockpool from among the plurality of deduplication blockpools;
   upon determining that the plurality of blocklets includes at least the threshold number of blocklets:
      selecting, according to a second, different rule set, a target blockpool from among the plurality of deduplication blockpools, where the second, different rule set includes a BalanceQuery rule that computes a fitness value for a member of the plurality of deduplication blockpools, and that selects a target blockpool from among the plurality of deduplication blockpools based, at least in part, on the fitness value; and
   providing the BLOB to the target blockpool.

2. The non-transitory computer-readable storage device of claim 1, the operations further comprising:
   determining which member of the plurality of deduplication blockpools was the most recently selected target blockpool from among the plurality of deduplication blockpools; and
   assigning the most recently selected target blockpool as a current affinity blockpool.

3. The non-transitory computer-readable storage device of claim 2, where selecting, according to the first rule set, a target blockpool from among the plurality of deduplication blockpools comprises:
   determining if the current affinity blockpool has been used as the target blockpool less than a threshold number of times consecutively;
   upon determining that the current affinity blockpool has been used as the target blockpool less than the threshold number of times consecutively:
      selecting the current affinity blockpool as the target blockpool;
   upon determining that the current affinity blockpool has been used at least the threshold number of times consecutively:
      selecting randomly from among the plurality of deduplication blockpools, another, different member of the plurality of deduplication blockpools as the target blockpool;
      setting the threshold number of times to twelve; and
      assigning the target blockpool as the current affinity blockpool.

4. The non-transitory computer-readable storage device of claim 2, where the fitness value is based, at least in part, on a correspondence between a subset of the plurality of blocklets and blocklets stored in a member of the plurality of deduplication blockpools, where the subset of the plurality of blocklets contains fewer members than the plurality of blocklets, and further based on a ratio of the remaining storage capacity of the member of the plurality of deduplication blockpools to the remaining storage capacity of the member of the plurality of deduplication blockpools having the largest remaining storage capacity.

5. The non-transitory computer-readable storage device of claim 4, where the fitness value is weighted.

6. The non-transitory computer-readable storage device of claim 5, the operations further including:
   upon determining that the remaining capacity of the plurality of deduplication blockpools is less than a threshold value:
      weighting the fitness value to favor increased deduplication;
   upon determining that the remaining capacity of the plurality of deduplication blockpools is not less than the threshold value:
      weighting the fitness value to favor load balancing across the plurality of deduplication blockpools.

7. The non-transitory computer-readable storage device of claim 4, where the fitness value has a value in the range [0, 2].

8. The non-transitory computer-readable storage device of claim 4, where selecting, according to the second, different rule set, a target blockpool from among the plurality of deduplication blockpools further comprises:
   determining the number of members of the plurality of deduplication blockpools have that the same fitness value or have the same number of matching blocklets with the subset of the plurality of blocklets;
   upon determining no members of the plurality of deduplication blockpools have the same numbers of matching blocklets with the subset of the plurality of blocklets:
      selecting the member of the plurality of deduplication blockpools having the most matching blocklets as the target blockpool;
   upon determining that at least two members of the plurality of deduplication blockpools have the same fitness value or have the same number of matching blocklets with the subset of the plurality of blocklets, or upon determining that no members of the plurality of deduplication blockpools have any blocklets matching the subset of the plurality of blocklets:
      determining if the current affinity blockpool has been used as the target blockpool less than a threshold number of times consecutively;
      upon determining that the current affinity blockpool has been used as the target blockpool less than the threshold number of times consecutively:
         selecting the current affinity blockpool as the target blockpool;

upon determining that the current affinity blockpool has been used at least the threshold number of times consecutively:

determining the remaining capacity of a member of the plurality of deduplication blockpools;

upon determining that only one member of the plurality of deduplication blockpools has the largest remaining capacity:

selecting the member of the plurality of blockpools having the largest remaining capacity as the target blockpool; and setting the threshold number of times to twelve;

upon determining that at least one other, different member of the plurality of deduplication blockpools has the same largest remaining capacity as the remaining capacity of the member of the plurality of deduplication blockpools:

selecting randomly from among the plurality of deduplication blockpools having the same largest remaining capacity, a member of the plurality of deduplication blockpools having the same largest remaining capacity as the target blockpool; and setting the threshold number of times to twelve; and assigning the target blockpool as the current affinity blockpool.

9. The non-transitory computer-readable storage device of claim 1, where the BLOB has a first size of 256 MB.

10. The non-transitory computer-readable storage device of claim 1, where the threshold number of blocklets is ten.

11. The non-transitory computer-readable storage device of claim 1, where the BLOB has a first size of 16 MB.

12. The non-transitory computer-readable storage device of claim 4, where the subset of the plurality of blocklets is selected by:

computing a blocklet hash modulo a decimate value, where the decimate value is an integer;

upon determining that the blocklet hash modulo the decimate value equals zero:

selecting the blocklet as a member of the subset of the plurality of blocklets.

13. The non-transitory computer-readable storage device of claim 12, where the decimate value is at least 500 and less than or equal to 1000.

14. The non-transitory computer-readable storage device of claim 1, where the overhead cost of adding a deduplication blockpool to the plurality of deduplication blockpools scales linearly.

15. An apparatus for distributing data from a source to a plurality of deduplication blockpools, the apparatus comprising:

a processor;

a memory configured to store a binary large object (BLOB) having a first size, where the BLOB includes a plurality of blocklets, a blocklet having a hash value and a second size, where the second size is smaller than the first size;

an input/output (I/O) interface;

a set of circuits; and an interface configured to connect the processor, the memory, the I/O interface, and the set of circuits, the set of circuits including an affinity circuit, a rule set selection circuit, a first rule set circuit, a second rule set circuit, and a data redirection circuit;

the affinity circuit configured to:

determine which member of the plurality of deduplication blockpools was the most recently selected target blockpool from among the plurality of deduplication blockpools;

assign the most recently selected target blockpool as a current affinity blockpool;

the rule set selection circuit configured to:

determine the number of blocklets in the plurality of blocklets; and select the first rule set circuit or the second rule set circuit to select a target blockpool, where the rule set selection circuit selects the first rule set circuit or the second rule set circuit based on the number of blocklets in the plurality of blocklets;

the first rule set circuit configured to select a target blockpool from among the plurality of deduplication blockpools according to an affinity rule or a randomness rule;

the second rule set circuit configured to select a target blockpool from among the plurality of deduplication blockpools according to a balancing rule, an affinity rule, a size rule, or a randomness rule; and the data redirection circuit configured to provide the BLOB to the target blockpool.

16. The apparatus of claim 15, where the rule set selection circuit is further configured to:

upon determining that the number of blocklets in the plurality of blocklets is less than a threshold number of blocklets:

select the first rule set circuit;

upon determining that the number of blocklets in the plurality of blocklets is at least the threshold number of blocklets:

select the second rule set circuit.

17. The apparatus of claim 16, where the threshold number of blocklets is ten.

18. The apparatus of claim 15, where the first rule set circuit is further configured to:

determine if the current affinity blockpool has been used as the target blockpool less than a threshold number of times consecutively;

upon determining that the current affinity blockpool has been used as the target blockpool less than the threshold number of times consecutively:

select the current affinity blockpool as the target blockpool;

upon determining that the current affinity blockpool has been used at least the threshold number of times consecutively:

select randomly from among the plurality of deduplication blockpools, another, different member of the plurality of deduplication blockpools as the target blockpool;

set the threshold number of times to twelve; and assign the target blockpool as the current affinity blockpool.

19. The apparatus of claim 15, where the second rule set circuit is configured to compute a fitness value for a member of the plurality of deduplication blockpools, where the second rule set circuit is configured to compute the fitness value is based, at least in part, on a correspondence between a subset of the plurality of blocklets and blocklets stored in a member of the plurality of deduplication blockpools, where the subset of the plurality of blocklets contains fewer members than the plurality of blocklets, and further based on a ratio of the remaining storage capacity of the member of the plurality of deduplication blockpools to the remaining storage capacity of the member of the plurality of deduplication blockpools having the largest remaining storage capacity.

20. The apparatus of claim 19, where the second rule set circuit is further configured to:
   determine the number of members of the plurality of deduplication blockpools have that the same fitness value or have the same number of matching blocklets with the subset of the plurality of blocklets;
   upon determining no members of the plurality of deduplication blockpools have the same numbers of matching blocklets with the subset of the plurality of blocklets:
      select the member of the plurality of deduplication blockpools having the most matching blocklets as the target blockpool;
   upon determining that at least two members of the plurality of deduplication blockpools have the same fitness value or have the same number of matching blocklets with the subset of the plurality of blocklets, or upon determining that no members of the plurality of deduplication blockpools have any blocklets matching the subset of the plurality of blocklets:
      determine if the current affinity blockpool has been used as the target blockpool less than a threshold number of times consecutively;
      upon determining that the current affinity blockpool has been used as the target blockpool less than the threshold number of times consecutively:
         select the current affinity blockpool as the target blockpool;
      upon determining that the current affinity blockpool has been used at least the threshold number of times consecutively:
         determine the remaining capacity of a member of the plurality of deduplication blockpools;
         upon determining that only one member of the plurality of deduplication blockpools has the largest remaining capacity:
            select the member of the plurality of blockpools having the largest remaining capacity as the target blockpool; and
            set the threshold number of times to twelve
         upon determining that at least one other, different member of the plurality of deduplication blockpools has the same largest remaining capacity as the remaining capacity of the member of the plurality of deduplication blockpools:
            select randomly from among the plurality of deduplication blockpools, a member of the plurality of deduplication blockpools having the same largest remaining capacity as the target blockpool; and
            set the threshold number of times to twelve;
   and
   assign the target blockpool as the current affinity blockpool.

21. The apparatus of claim 19, where the second rule set circuit is further configured to select the subset of the plurality of blocklets by:
   computing a blocklet hash modulo a decimate value, where the decimate value is an integer;
   upon determining that the blocklet hash modulo the decimate value equals zero:
      selecting the blocklet as a member of the subset of the plurality of blocklets.

22. The apparatus of claim 21, where the decimate value is at least 500 and less than or equal to 1000.

23. A non-transitory computer-readable storage device storing computer-executable instructions that when executed by a computer control the computer to perform a method for distributing data from a source to a plurality of deduplication blockpools, the method comprising:
   accessing a binary large object (BLOB) having a first size, the BLOB including a plurality of blocklets, a blocklet having a second, different size that is smaller than the first size, a blocklet further having a hash;
   determining whether the plurality of deduplication blockpools supports BLOB-level redirection, or blocklet-level redirection;
   upon determining that the plurality of deduplication blockpools supports blocklet-level redirection:
      selecting a target blockpool for a member of the plurality of blocklets based on a value of the hash of the member the plurality of blocklets modulo P, where P is the number of deduplication blockpools in the plurality of deduplication blockpools; and
      providing the blocklet to the target blockpool;
   upon determining that the plurality of deduplication blockpools supports BLOB-level redirection:
      determining the number of blocklets in the BLOB;
      upon determining that the number of blocklets in the BLOB is less than a threshold number of blocklets:
         selecting a target blockpool from among the plurality of deduplication blockpools according to a first rule set;
      upon determining that the number of blocklets in the BLOB is at least the threshold number of blocklets:
         selecting a target blockpool from among the plurality of deduplication blockpools according to a second, different rule set, where the second, different rule set computes a fitness value for a member of the plurality of deduplication blockpools, and that selects a target blockpool from among the plurality of deduplication blockpools based, at least in part, on the fitness value, where the fitness value is a function of a correspondence between a subset of the plurality of blocklets and blocklets stored in a member of the plurality of deduplication blockpools, where the subset of the plurality of blocklets contains fewer members than the plurality of blocklets, and further based on a ratio of the remaining storage capacity of the member of the plurality of deduplication blockpools to the remaining storage capacity of the member of the plurality of deduplication blockpools having the largest remaining storage capacity; and
      providing the BLOB to the target blockpool.

* * * * *